3,271,356
GRANULES OF FINELY DIVIDED RUBBER REINFORCING SILICEOUS PIGMENT AND RUBBERY MATERIAL

Gerd Roderburg, Bad Godesberg, and Gerhard Steenken, Wesseling (Rhine), Germany, assignors to Deutsche Gold- und Silber-Scheideanstalt vormals Roessler, Frankfurt am Main, Germany, a corporation of Germany
No Drawing. Filed Dec. 4, 1961, Ser. No. 156,952
3 Claims. (Cl. 260—41.5)

This invention relates to granular filler materials for natural or synthetic rubbers. It more particularly concerns the preparation and use of granular fillers which possess enhanced mechanical strength.

In order to facilitate the incorporation of fillers in rubber and to eliminate excessive dusting, finely divided siliceous fillers may be formed or compacted into granules. For such granular form to be particularly useful, the granules should be sufficiently strong to sustain transportation, storage and handling, yet readily disintegrable when admixed with rubber in order that the filler uniformly distributes in the matrix.

One procedure for preparing granules involves mixing finely divided filler with an aqueous dispersion of rubber latex, and thereafter passing the mixture through nozzles into a rotating container to agglomerate and granulate. The resulting granules contain approximately 10 to 40 percent by weight of the rubber. One of the disadvantages in this procedure is the necessity for initially dehydrating and drying the finely divided filler, and after granulation, again drying to remove water introduced by the mixing with aqueous dispersion. Moreover, the rubber content in the granules is relatively large.

It has now been found that stable, strong granules of siliceous filler may be provided without the necessity of the aforementioned plurality of dryings and with reduced rubber contents. These and other ends are attained, in accordance with this invention, by mixing a latex of rubbery material, notably latex-milk of natural rubber or synthetic rubber with a suspension of the finely divided siliceous filler such as is obtained after precipitation in aqueous media of the siliceous filler without separating or drying the filler. Typically, such dispersions contain from 1 to 10 percent by weight of siliceous filler. This mixture, in which the latex ingredients are absorbed by the filler particles, is pressed out according to recognized procedures (filtering with rotary filters or filter presses) and eventually granulated and dried.

After pressing in which considerable water is removed, and washing when desirable, a dough is provide by a partial drying, the solid content (filler and rubber) of which is typically about 40 percent by weight (e.g., between 35 and 45 weight percent). This dough composition is subsequently dried and granulated (or granulated and then dried). The resulting granules are several millimeters in size, predominantly between 3 and 10 millimeters in size. They usually contain no more than about 2 percent water by weight. They can be easily transported in bags, drums or barrels, and can be handled without difficulty and with safety during mixing. The granules disintegrate when worked into rubbery elastomers rapidly and uniformly so that the filler is smoothly, finely and uniformly distributed on rollers or kneaders.

The amount of rubber latex is controlled to from 0.2 to 7.5 percent by weight basis the solid content of filler material in the aqueous suspension. Since substantially complete adsorption of latex by the filler may and usually is achieved, the granules contain about 0.2 to 7.5 percent rubber by weight of siliceous material.

A protective colloid such as casein can be added in small amounts to the latex, typically in an amount of from 1 to 3 percent by weight of the rubber. Other known protective colloids may be used including those which are polyethylene-fatty acid condensation products.

The preparation of these granules in accordance with this invention is illustrated by the following example:

A suspension of finely divided siliceous filler obtained by precipitation of an aqueous solution of sodium silicate with an acid containing 45 grams $SiO_2$ per liter is carefully mixed in a precipitation barrel with a latex-milk of cold natural rubber using 0.5 part by weight of rubber per 100 parts by weight of filler (dry basis) in the suspension. The latex contains 3 percent casein by weight of the rubber. The suspension, containing latex, is filtered in filter presses and washed with water, to provide a dough.

By drying, the water content of this dough is reduced and the solid content is raised to about 40 weight percent. This pre-dried material is granulated on a roller granulator, and subsequently dried on a band drier down to a water content of 2 weight percent.

In accordance to determine the strength of granules produced in accordance with the present invention, as compared with granules produced by the conventional process, the granules were subjected to the following tests for different mechanical stresses.

(1) SHAKING

A sample of granules 3 millimeters in size, freed of dust by screening through a 0.5 millimeter sieve, is placed in a bottle (500 milliliter contents) and the bottle shaken (on a shaken apparatus, Kottermann 5627) for 0.5 hour and one hour respectively. The content of the bottle in an amount of 100 grams is subsequently passed again through a 0.5 millimeter sieve and the amount of dust which passed through the screen is measured.

(2) ROLLING

One hundred grams of granules, treated as indicated under (1) Shaking, are placed in a tin can 160 millimeters high and 115 millimeters in diameter. This can is rolled on a rolling machine for one hour. The amount of particles smaller than 0.5 millimeter is then determined.

(3) MILLING

Twenty grams of granules treated as indicated under (1) Shaking are milled with a ball weighing approximately 75 grams for 5 minutes in a Reisch mill. The amount of material less than 0.5 millimeter is determined.

(4) GRINDING ON ROLLERS

Ten grams of the granules are placed in a rectangular polyethylene bag. With the filling distributed on an area of 17 by 7 centimeters, the contents are twice subjected to rolling under a pressure of 2 kilograms per square inch. The amount of material less than 0.5 millimeter is determined.

Results of these tests are compiled in the following table:

Test

| Material | Shaking | | Rolling, 1 hour | Milling, 5 minutes | Grinding |
|---|---|---|---|---|---|
| | 0.5 hour | 1 hour | | | |
| (Weight percent less than 0.5 millimeter) | | | | | |
| 1. Silica-granules without rubber | 10.6 | 22.5 | 14.4 | 58.5 | 30.0 |
| 2. Silica-granules according to invention with 0.5% rubber | 2.6 | 6.8 | 0.6 / 1.7 | 28.5 | 10.0 |
| 3. Silica-granules according to invention with 1% rubber | 1.6 | 3.2 | 2.0 / 3.4 | 28.5 | 5.0 |
| 4. Silica-granules according to invention with 3% rubber | 1.1 | 4.1 | 3.0 | 32.0 | 5.0 |
| 5. Silica-granules according to invention with 5% rubber | 0.6 | 1.9 | 2.1 | 20.0 | 5.0 |

The siliceous filler content of these granules is provided by any of a wide number of finely divided precipitated siliceous materials, notably those which offer excellent rubber reinforcing properties. In general, finely divided pigmentary siliceous materials having excellent rubber reinforcing properties have an average ultimate particle size below 1.0 micron, preferably between 0.01 and 0.03 micron and a specific surface area between 50 and 300 square meters per gram. Useful siliceous pigmentary materials include finely divided precipitated hydrated silicas, alkaline earth metal silicates such as calcium silicates, aluminum silicates, mixed silicates such as sodium aluminum silicates and the like.

Besides natural rubber, the granules may be formed from synthetic rubber compositions including butadiene-1,3-styrene copolymers, butadiene-acrylonitrile copolymers, butadiene-isobutylene copolymers and like synthetic elastomers which are derived from polymerizing butadiene-1,3,2-chlorobutadiene, isoprene, ethylene or the like alone or with other polymerizable materials including styrene, methyl methacrylate, methyl chloroacrylate, acrylonitrile, vinyl chloride, and their equivalents.

Although the present invention has been described by reference to specific details of certain embodiments, it is to be understood that it is not intended the invention be construed as limited to such details except insofar as they appear in the accompanying claims.

We claim:

1. A method of preparing granules of siliceous pigmentary filler which comprises adding to an aqueous dispersion of solid siliceous pigmentary filler from 0.2 to 7.5 percent of rubbery latex by weight of the solid siliceous pigmentary filler content of the dispersion, said siliceous filler consisting essentially of finely divided particles having an average ultimate particle size below 1 micron and a specific surface area between 50 and 300 square meters per gram and being a member selected from the group consisting of precipitated hydrated silicas, alkaline earth metal silicates, aluminum silicates, and sodium aluminum silicates, said rubber consisting essentially of a material selected from the group consisting of natural rubber, butadiene-styrene copolymers, butadiene-acrylonitrile copolymers, butadiene homopolymers, 2-chlorobutadiene polymers, isoprene polymers and ethylene polymers, removing water and partially drying to form a dough of the resulting siliceous filler-rubber material, granulating the dough and thereafter drying further to reduce the water content to below 2 weight percent to produce granules consisting essentially of said siliceous pigmentary filler and said rubber material.

2. The method of claim 1, wherein the solid siliceous pigmentary filler content of the aqueous dispersion is from 1 to 10 percent by weight.

3. A granular composition comprising granules predominantly between 3 to 10 millimeters in size consisting essentially of finely divided precipitated siliceous pigmentary filler having an average ultimate particle size below 1 micron and a specific surface area between 50 and 300 square meters per gram and being selected from the group consisting of precipitated hydrated silicas, alkaline earth metal silicates, aluminum silicates and sodium aluminum silicates, containing absorbed rubbery material consisting essentially of a material selected from the group consisting of natural rubber, butadiene-styrene copolymers, butadiene-acrylonitrile copolymers, butadiene homopolymers, 2-chlorobutadiene polymers, isoprene polymers and ethylene polymers, the absorbed rubbery material content of said granules being from 0.2 to 7.5 percent by weight of the siliceous filler.

References Cited by the Examiner

UNITED STATES PATENTS

| | | | |
|---|---|---|---|
| 2,470,577 | 5/1949 | Roderick et al. | 260—41.5 |
| 2,560,043 | 7/1951 | Schmidt | 260—41.5 |
| 2,835,642 | 5/1958 | Safford et al. | 117—100 |
| 2,892,807 | 6/1959 | Sellers et al. | 260—41.5 |
| 3,003,990 | 10/1961 | Umland et al. | 117—100 |

OTHER REFERENCES

Wilson: British Compounding Ingredients for Rubber, 1958, W. Heffer & Sons Ltd., Cambridge, England, page 385.

Whitby: "Synthetic Rubber," published 1954, by Wiley & Sons, page 668.

WILLIAM H. SHORT, *Primary Examiner.*

ALPHONSO SULLIVAN, JAMES A. SEIDLECK,
*Examiners.*

J. ZIEGLER, J. NORRIS, *Assistant Examiners.*